3,277,116
PROCESS FOR THE PRODUCTION OF
3-INDOLEALKANOIC ACIDS
David W. Young and Robert C. Strand, Homewood, Ill., assignors to Sinclair Research Inc., New York, N.Y., a corporation of Delaware
No Drawing. Filed Dec. 20, 1963, Ser. No. 332,232
7 Claims. (Cl. 260—326.13)

This invention relates to a process for the rearrangement of 1-indolealkanoic acid to 3-indolealkanoic acid using the metal salts of styrene-maleic anhydride resins as catalysts.

The acids prepared by the process of the invention have the following structural formula:

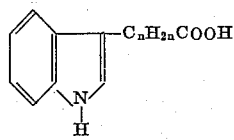

wherein $n$ is an integer from about 1 to 17. Examples of 3-indolealkanoic acids are 3-indoleacetic acid, 3-indolepropionic acid, 3-indolepentanoic acid, 2-(3'-indolyl)-3-ethylpentanoic acid and the like.

The 3-indolealkanoic acids of this invention have been the subject of investigation over a period of the last 30 years regarding their plant growth regulating properties. A great many useful effects have been discovered, for example, indoleacetic acid affects the rooting of certain varieties of potato. Beta-(3-indolyl)propionic acid can be used to prepare lysergic acid useful as a pharmaceutical. Although 1-indolealkanoic acids may be easily prepared, the preparation of 3-indolealkanoic acids has presented difficulty.

It has now been found that 1-indolealkanoic acids can be rearranged to the corresponding 3-indolealkanoic acids in high yields by a novel process. The process of this invention comprises the formation of the 3-indolealkanoic acid structure by contacting the corresponding 1-indolealkanoic acid with an alkali metal or zinc salt of a styrene-maleic anhydride resin and, if the acid is desired, acidifying the reaction mixture in order to recover 3-indolealkanoic acid. The term acid as used throughout this disclosure refers to the carboxylate structure and may include both the actual acid and the metal salt of the acid. Thus both the starting 1-indolealkanoic and the product 3-indolealkanoic acid may be partly or entirely in the salt form. In order to maintain the styrene-maleic anhydride resin in the metal salt form, the reaction normally is carried out in an essentially anhydrous basic medium. As a result, at least a part of the product is in the form of a metal 3-indolealkanoate which can be acidified to form the 3-indolealkanoic acid.

The 1-indolealkanoic acid is represented by the following formula:

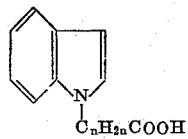

wherein $n$ is an integer having a value from about 1 to about 17 and preferably from about 1 to 7. The 1-indolealkanoic acid may be substituted with non-deleterious substituents, for example, hydrocarbon radicals such as alkyl and aryl radicals. Illustrative of the 1-indolealkanoic acids used are 1-indole acetic acid, 1-indolepropionic acid, 1-indolepentanoic acid, the 1-indoleoctanoic acids and the 1-indoledecanoic acids. The 1-indolealkanoic acids may be prepared by any desired method. In one method of preparation, indole is reacted with acrylic acid in the absence of solvent at 120–130° C. to give 1-indolepropionic acid.

The styrene-maleic anhydride copolymer, the metal salt of which is employed in the present invention, is a resinous copolymer of styrene and maleic anhydride having about 0.5 to 3 moles of styrene per mole of maleic anhydride, preferably about 1:1. The molecular weights of the copolymers are often at least about 600 up to about 2000 but can be of higher molecular weight, e.g. up to about 50,000 or more. The melting points of the lower molecular weight copolymers will generally range from about 80 to 200° C. as determined by the Fisher-Johns melting point apparatus. The amount of copolymer used may vary widely but it should be present in an amount sufficient to promote the rearrangement to the 3-indolealkanoic acid. Normally from about 15 to 60% copolymer salt based upon the weight of 1-indole alkanoic acid is satisfactory.

Preparation of the copolymer of the invention can be by any method desired. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, which can be either the active aromatic solvents, that is, containing an active hydrogen atom, such as cumene, p-cymene, etc. or the non-active aromatics such as xylene, toluene, etc. The active aromatic solvents are chain-terminating solvents and give lower molecular weight products. Other suitable solvents are the ketones, such as methylethylketone, which are also active solvents. The preferred manner of carrying out the polymerization is by what is known in the art as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Formation of the metal salt of the copolymer can be accomplished by simple hydrolysis of the copolymer with metal hydroxide solution. Any of the alkali metal and zinc hydroxides can be utilized, although sodium and zinc hydroxides are preferred. The hydrolysis can be conveniently carried out by making a slurry in distilled water of at least 2 moles of metal hydroxide per mole of the repeating copolymer unit and heating until hydrolysis is complete. Although stoichiometric proportions which give the full, i.e. the di, salt of the copolymer are preferred, either copolymer or metal hydroxide may be employed in excess. The copolymer salt may be recovered by evaporation of the aqueous reaction medium.

The styrene maleic anhydride polymer may be hydrogenated to remove residual olefinic unsaturation or it may be unhydrogenated. Either form is highly effective in the rearrangement reaction. The order of contacting the reactants is not critical. They may be added to the reaction vessel at the same time or separately in any desired order. Reaction temperatures may vary from about 140 to 260° C. Preferably the reaction mixture should be in the range of about 180° to 225° C.

Depending upon the nature of the reactants and temperatures employed, reaction times have varied from 4 to 20 hours but the time is dependent upon for instance the nature of the reaction conditions, reaction vessel, etc.

When the reaction is carried out in the presence of a basic salt of a resin, the 3-indolealkanoic acid is formed at least in part as metal salt. The salt of the 3-indolealkanoic acid can be recovered by any desired means. For example, recovery can be accomplished by dissolving the alkali metal 3-indolealkanoate in water or by removing it by a solvent extraction procedure. A convenient recovery procedure is to add water in order to dissolve the metal 3-indolealkanoate. This water solution can then be extracted with a solvent such as ether. The aqueous phase containing the 3-indolealkanoate can then be acidified with a mineral acid such as hydrochloric or sulfuric or with an organic acid such as formic or acetic acid. The acidification results in the formation of a 3-indoleacetic acid precipitates which can be removed from the water by filtration, centrifugation, etc.

The following examples further illustrate the process of the present invention.

EXAMPLE 1

Using the procedure reported by H. E. Fritz, Journal of Organic Chemistry, 28, No. 5, May 1963, page 1385, to a stainless steel flask 9 grams of 1-indolepropionic acid and 5 grams of potassium hydroxide were added. The mixture was stirred and heated to 210° C. for 9 hours. The mixture was then diluted with 100 ml. of water and extracted with isopropyl ether. The water layer was acidified and 3.4 grams of 3-indolepropionic acid (a 41% yield) was recovered.

EXAMPLE 2

To a stainless steel flask 9 grams of 1-indolepropionic acid and 5 grams of the potassium salt of a styrene-maleic anhydride resin having a styrene-maleic anhydride mole ratio of 1:1 and a molecular weight of about 1000 were added. The mixture was stirred and heated to 210° C. for 9 hours. The mixture was then diluted with 100 ml. of water and extracted with isopropyl ether. The water layer was acidified and 6.85 grams of 3-indolepropionic acid (a 76% yield) was recovered.

EXAMPLE 3

The zinc salt of a styrene-maleic anhydride resin having a mole ratio of 1:1 and a molecular weight of about 1000 was made by reacting the sodium salt of the resin with zinc chloride in water solution. The water-insoluble zinc salt was washed with water and filtered to remove from it the solution of sodium chloride. This colorless zinc salt, with the following analysis, was used as a catalyst.

*Analysis of Zn salt of styrene-maleic anhydride resin*

|    | Percent |
|----|---------|
| Zn | 14.9    |
| C  | 35.0    |
| H  | 5.60    |
| Na | 5.08    |
| O  | 24.66   |

A stirred mixture of 9 grams of 1-indolepropionic acid and 5 grams of the above identified styrene-maleic anhydride zinc salt was heated at 210° C. for 9 hours in a stainless steel flask. The cooled mixture was diluted with 100 ml. of water and extracted with isopropyl ether (100 ml.). After acidification with HCl of the aqueous layer to pH of 3, and filtration to remove the insoluble zinc salt, 5.72 grams of 3-indolepropionic acid was recovered. This is a 25% better yield than by other methods which had been reported in the literature.

EXAMPLE 4

The rearrangement reaction of example 3 was repeated using 5 grams of ZnO in place of the Zn salt of the styrene-maleic anhydride resin. The yield of 3-indolepropionic acid was only 21%.

It is claimed:

1. A process for producing a reaction mixture containing the metal salt of 3-indolealkanoic acid, which consists essentially of contacting at a temperature of about 140 to 260° C. a 1-indolealkanoic acid having the following formula:

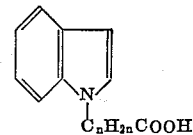

wherein $n$ is an integer from 1 to 17 with a metal salt of a styrene-maleic anhydride resin having about 0.5 to 3 moles of styrene per mole of maleic anhydride, said salt of a styrene-maleic anhydride resin being present in an amount sufficient to promote the formation of the 3-indolealkanoic acid salt and the metal of said resin salt being selected from the group consisting of alkali metals and zinc.

2. The process of claim 1 wherein the 1-indolealkanoic acid is 1-indoleacetic acid.

3. The process of claim 1 wherein the 1-indolealkanoic acid is 1-indolepropionic acid.

4. The process of claim 1 wherein the reaction product is acidified to form a 3-indolealkanoic acid.

5. The process of claim 4 wherein the temperature is from about 180 to 225° C. and the amount of resin salt is about 15 to 60% based on the weight of the 1-indolealkanoic acid feed.

6. The process of claim 5 wherein the 1-indolealkanoic acid is selected from the group consisting of 1-indoleacetic acid and 1-indolepropionic acid.

7. A process for producing a reaction mixture containing the metal salt of 3-indolealkanoic acid, which consists essentially of contacting at a temperature of about 140 to 260° C. a 1-indolealkanoic acid having the following formula:

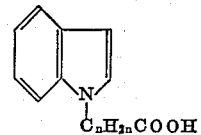

wherein $n$ is an integer from 1 to 7 with a metal salt of a styrene-maleic anhydride resin having about 0.5 to 3 moles of styrene per mole of maleic anhydride, said salt of a styrene-maleic anhydride resin being present in an amount sufficient to promote the formation of the 3-indolealkanoic acid salt and the metal of said resin salt being selected from the group consisting of alkali metals and zinc.

References Cited by the Examiner

Fritz: Jour. of Organic Chem., vol. 28, May 1963, pages 1384–1386.

ALEX MAZEL, *Primary Examiner.*

NICHOLAS S. RIZZO, *Examiner.*

MARY U. O'BRIEN, *Assistant Examiner.*